United States Patent [19]

Chikamoto et al.

[11] Patent Number: 4,603,392
[45] Date of Patent: Jul. 29, 1986

[54] CONTROLLING METHOD AND APPARATUS FOR GRINDING MACHINES

[75] Inventors: Takeshi Chikamoto, Atsugi; Toshitaka Nagai, Nagoya, both of Japan

[73] Assignee: Amada Company, Limited, Japan

[21] Appl. No.: 729,096

[22] Filed: May 3, 1985

Related U.S. Application Data

[63] Continuation of Ser. No. 444,189, Jan. 24, 1982, abandoned.

[30] Foreign Application Priority Data

Nov. 27, 1981 [JP] Japan .................................. 56-189205

[51] Int. Cl.⁴ ........................ G06F 15/46; G05B 19/18
[52] U.S. Cl. ..................................... 364/475; 364/171;
364/188; 364/191; 318/568; 51/165.17;
51/165.87
[58] Field of Search ................ 364/167, 171, 188–190,
364/194, 474–475; 318/567–569; 408/8–13;
51/20, 26, 88–89, 132, 134.5 R, 165.71, 165.87

[56] References Cited

U.S. PATENT DOCUMENTS

| 3,327,432 | 6/1967 | Lockwood | 51/165.87 |
| 3,809,488 | 5/1974 | Sonderegger | 408/8 X |
| 3,817,647 | 6/1974 | Lemelson | 408/8 |
| 4,170,851 | 10/1979 | Enos | 51/165.71 |
| 4,208,718 | 6/1980 | Chung | 364/474 |
| 4,293,913 | 10/1981 | Nishimura et al. | 364/474 |
| 4,296,364 | 10/1981 | Fukuyama et al. | 364/474 X |
| 4,382,215 | 5/1983 | Barlow et al. | 318/568 |
| 4,393,449 | 7/1983 | Takeda et al. | 364/474 |
| 4,428,055 | 1/1984 | Kelley et al. | 364/474 |

Primary Examiner—Gary V. Harkcom
Attorney, Agent, or Firm—Wigman & Cohen

[57] ABSTRACT

A method of and apparatus for controlling a grinding machine having a grinding wheel and a table for holding a workpiece to automatically perform desired operations in which data concerning the grinding characteristics of a plurality of grinding wheels and workpieces to be ground, as well as data concerning the operation to be performed, is inputted into a control unit containing a computer. The computer calculates the necessary information to perform the desired operation. The information is then converted into instructions for controlling the grinding machine to perform the desired operation.

11 Claims, 4 Drawing Figures

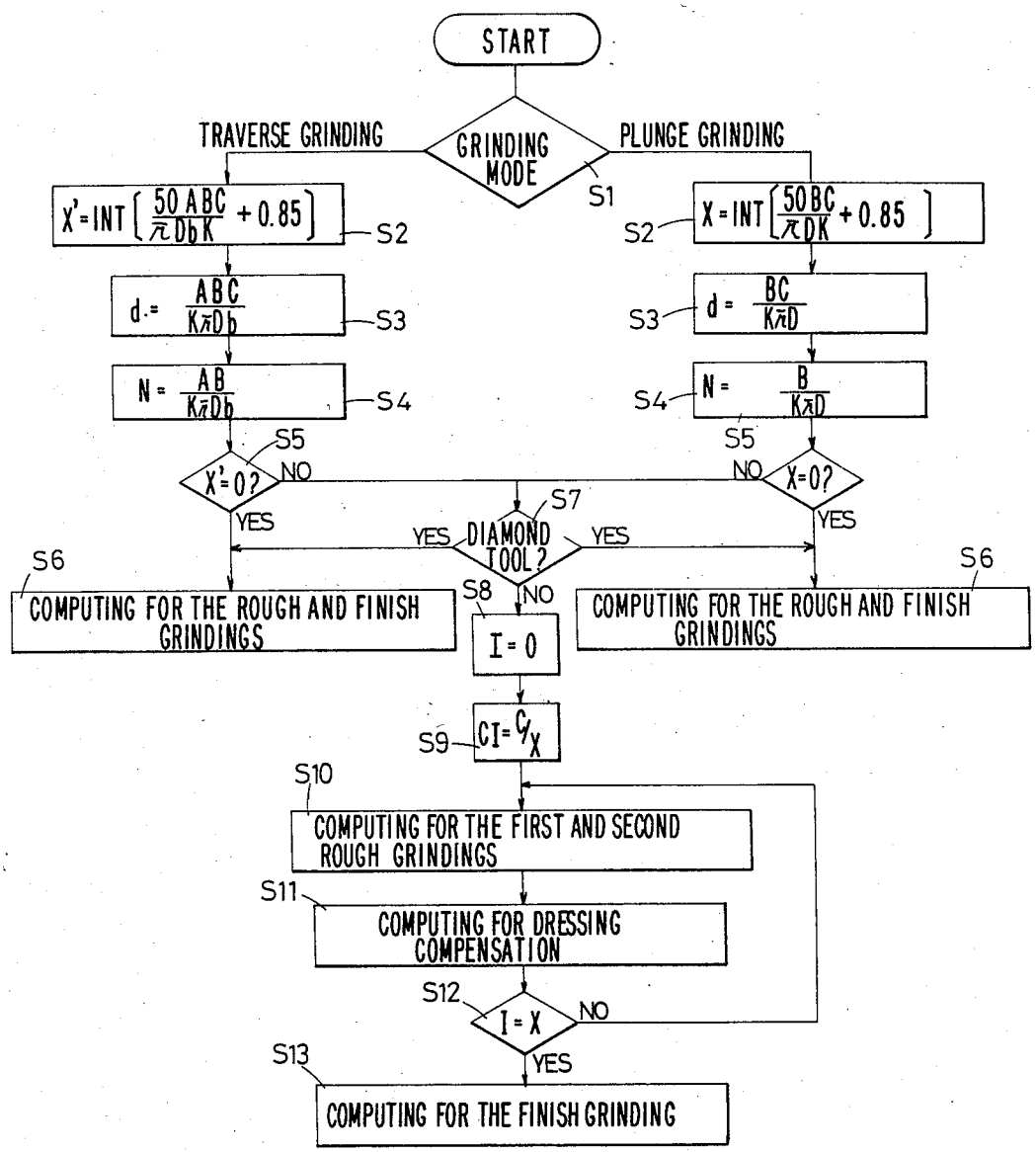

CONTROLLING METHOD AND APPARATUS FOR GRINDING MACHINES

This application is a continuation of application Ser. No. 444,189, filed Nov. 24, 1982, now abandoned.

BACKGROUND OF THE INVENTION

1. Field of the Invention

The present invention relates to grinding machines having a grinding finishes onto wheel for grinding metallic workpieces with a high degree of accuracy, and, more particularly, to a method of and apparatus for controlling grinding machines.

2. Description of the Prior Art

As is well-known, a grinding machine comprises a bed or base, a column vertically fixed to the bed, a grinding wheel carried by the column, a cross table horizontally movably mounted on the bed and a slide table which is horizontally movably mounted on the cross table to hold a workpiece to be ground. The grinding wheel is rotatably and vertically movably carried by the column in such a manner as to be brought into grinding contact with the workpiece held on the slide table. Specifically, the cross table is so mounted on the bed as to move forward and rearward and the slide table is so mounted on the cross table as to move rightward and leftward so that they may feed the workpiece into the grinding wheel during grinding operations. Of course, the horizontal movements of the cross table and the slide table are adjusted according to the width and length by which the workpiece is to be ground, and the vertical movement of the grinding wheel is controlled according to the grinding allowance or depth by which the workpiece is to be ground. Also, since the grinding wheel is severely worn during grinding operations, it is necessary to dress the grinding wheel on occasion to continue accurate grinding operations.

As to the grinding machine, grinding conditions vary in material and hardness of workpieces to be ground, length, width and depth to be ground from workpieces and hardness, width and peripheral speed of the grinding wheel. Therefore, it has been very difficult to control the rotation and the vertical movement of the grinding wheel and the horizontal movements of the cross table and the slide table. Also, it has been impossible to automatically control with a high degree of accuracy the grinding machine since not only do the grinding conditions vary, but the grinding wheel will also be severely worn.

SUMMARY OF THE INVENTION

It is, therefore, a primary object of the present invention to provide a method of and apparatus for controlling grinding machines automatically and with a high degree of accuracy.

It is a further object of the present invention to provide a method of and apparatus for controlling grinding machines in which grinding operations can be automatically and easily perfomed by selecting grinding modes and providing a controlling means, such as a computer, with necessary data relating to the workpieces to be ground and the grinding wheel to be used.

It is another object of the present invention to provide a method of and apparatus for controlling grinding machines in which the grinding wheel can be automatically dressed.

These and other objects of the present invention are accomplished by a grinding machine which is provided with a controlling means such as a computer in which the grinding conditions relating to workpieces to be ground have been previously stored. During the grinding operations, grinding conditions to be actually used are automatically computed by selecting grinding conditions displayed on a CRT (cathode ray tube) display and inputting the necessary data to the controlling means so that grinding operations can be automatically performed.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 4 is a flow chart diagram for controlling the grinding machine shown in FIG. 1.

DESCRIPTION OF THE PREFERRED EMBODIMENT

Figure 1:
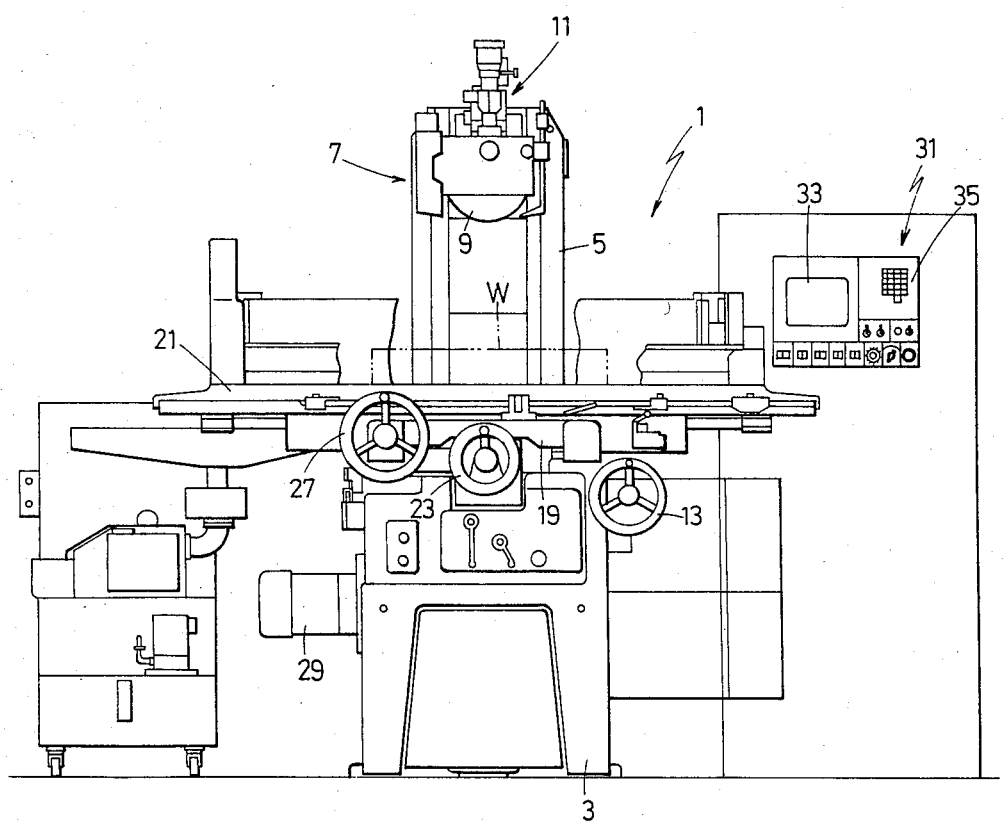
FIG. 1 is a front elevational view of a grinding machine embodying the principles of the present invention.
Figure 2:
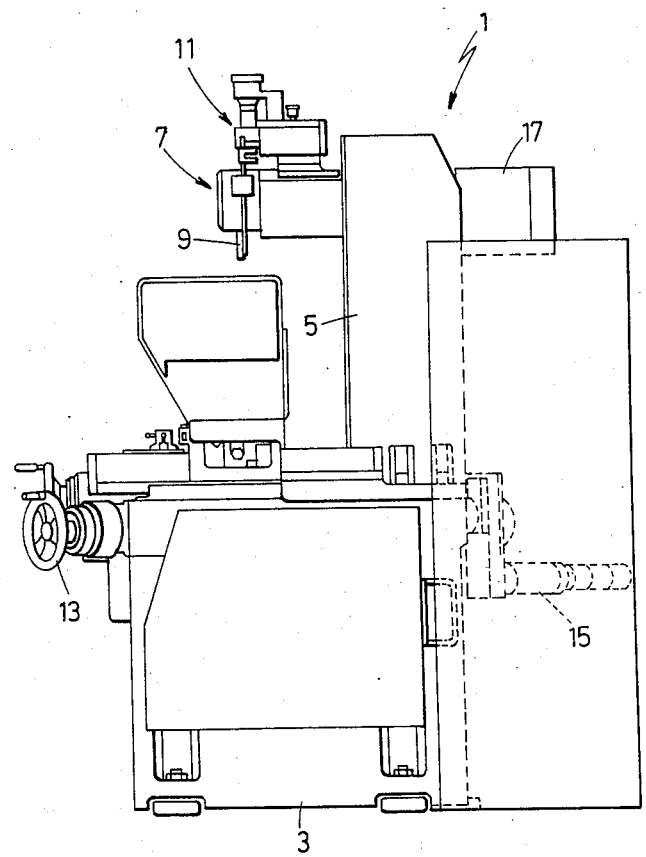
FIG. 2 is a side elevational view of the grinding machine shown in FIG. 1.

Referring to FIGS. 1 and 2, there is shown a grinding machine 1 which comprises a bed or base 3 and a column 5 vertically disposed at the rear portion of the bed 3 and carrying a grinding head 7 at its front. The grinding head 7 is vertically movably mounted on the front of the column 5 to carry a disk-like grinding wheel 9, and it is provided with a dressing means 11 for dressing the grinding wheel 9. The grinding head 7 is so arranged as to be vertically moved along the column 5 either manually by a handwheel 13 provided on a front portion of the bed 3 or automatically by a motor 15 mounted on a portion of the bed 3. As is conventional, the arrangement is such that the handwheel 13 remains idle without being rotated when the grinding head 7 is to be moved automatically along the column 5 by the motor 15. As is also conventional, the grinding wheel 9 is so arranged as to be rotatably driven on the grinding head 7 by a motor 17 which is mounted on the grinding head 7. Also, the dressing means 11 is provided with a dressing tool (not shown), and is so arranged that the dressing tool can be moved forward and rearward as well as toward and away from the periphery of the grinding wheel 9 on the grinding head 7 to dress the grinding wheel 9.

The dressing means 11 is used to dress the grinding wheel 9 on occasion when the grinding wheel 9 has been worn as a result of continuous grinding operations. During grinding operations, the grinding wheel 9 is continuously rotated and the dressing tool of the dressing means 11 is moved into contact with the periphery of the grinding wheel 9 in parallel with the axis thereof in such a manner as to roughen the grinding wheel 9. Also, in order to complete a dressing operation, the dressing tool of the dressing means 11 is moved or fed little by little toward the axis of the grinding wheel 9 after each dressing reciprocation on the periphery of the grinding wheel 9.

In the above described arrangement, during operation, the grinding wheel 9 is rotated and the grinding head 7 is lowered along the column 5 in order to keep the wheel 9 in grinding contact with the workpiece W being held on the slide table 21. Also, in order to feed the workpiece W to the grinding wheel 9, the cross table 19 is moved frontwardly and rearwardly on the bed 3 and the slide table 21 is moved rightward and leftward on the cross table 19. During automatic grinding operations, the grinding wheel 9, the grinding head 7, the cross table 19 and the slide table 21 can be all driven using a pre-programmed numerical control.

As seen also from FIGS. 1 and 2, the grinding machine 1 further comprises a cross table 19 movably mounted on the bed 3 and a slide table 21 movably mounted on the cross table 19 in order to hold a workpiece W to be ground. The cross table 19 is so mounted on the bed 3 as to be horizontally moved forwardly and rearwardly either manually by a handwheel 23 provided on a front portion of the bed 3 or automatically by a motor 25 in FIG. 3 mounted on a portion of the bed 3. The slide table 21 for holding the workpiece W is so mounted on the cross table 19 as to be horizontally moved rightward and leftward either manually by a handwheel 27 mounted also on a front portion of the bed 3 or automatically by a hydraulic motor 29 mounted on a portion of the bed 3. As is conventional, the handwheels 23 and 27 are so arranged as to remain idle without being rotated when the cross table 19 and the slide table 21, respectively, are automatically moved by the motors 25 and 29.

As shown in FIG. 1, the grinding machine 1 is provided with a controlling unit 31 for controlling the grinding wheel 9, the grinding head 7, the cross table 19, the slide table 21 and the dressing means 11. The controlling unit 31 is a computer which is provided with a CRT (cathode ray tube) display 33 and a keyboard 35 so that an operator of the grinding machine 1 can easily input necessary data to the computer.

Figure 3:
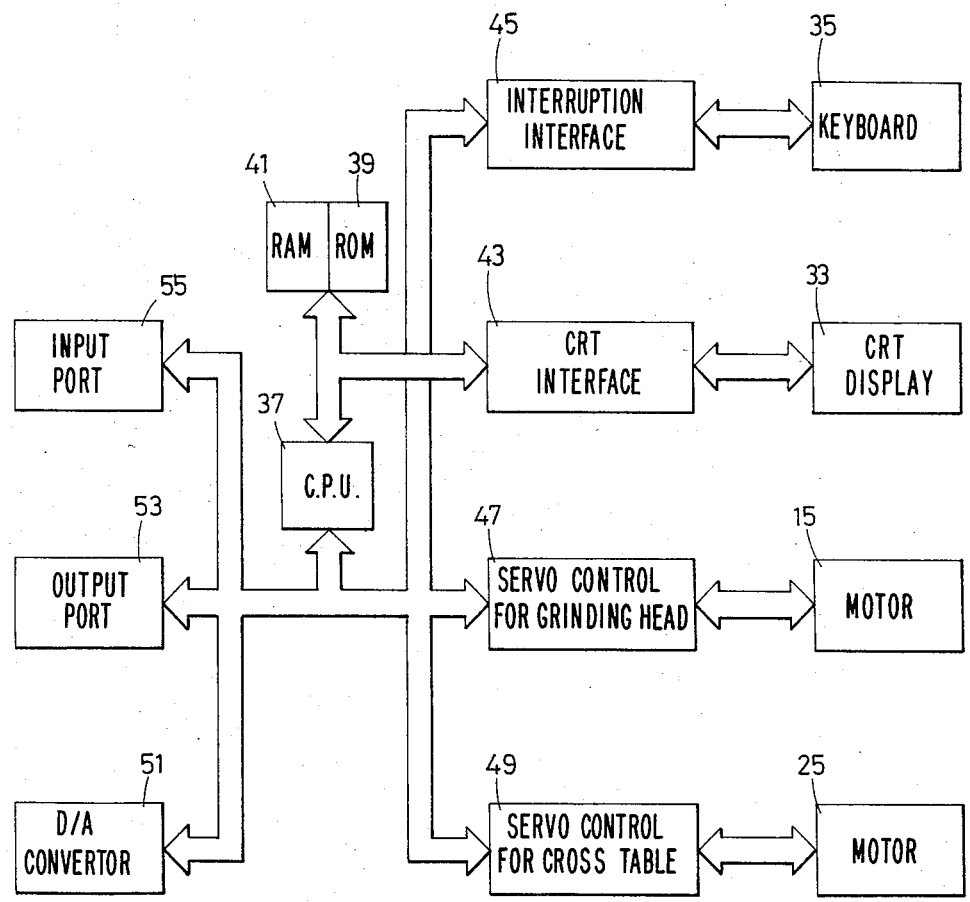
FIG. 3 is a block diagram of the control circuitry for the grinding machine shown in FIG. 1.

Referring to FIG. 3, the controlling unit 31 comprises a CPU (central processing unit) 37, a ROM (read only memory) 39 connected with the CPU 37 and a RAM (random access memory) 41 connected with the CPU 37. The CPU 37, the ROM 39 and the RAM 41 are mutually connected to a CRT interface 43 which is connected to the CRT display 33. The CPU 37 is also connected to an interruption interface 45 connected to the keyboard 35, a servo control 47 connected to the motor 15 for driving the grinding head 7 and a servo control 49 connected to the motor 25 for driving the cross table 19. The CPU 37 is further connected to a D/A (digital/analog) convertor 51 for setting the rotating speed, output ports 53 connected to a variety of actuating means such as solenoid operated valves and switches for lamps and input ports 55 connected to a variety of detecting means such as switches.

The controlling unit 31 has stored in it grinding conditions such as "Qualities" of the grinding wheel 9, "Grinding Depths", "Depth Settings" and "Peripheral Speeds" of the grinding wheel 9 and "Grinding Ratios" corresponding to "Materials or Kinds" of the workpieces to be ground. The "Materials or Kinds" of the workpieces may be classified, for instance, into "Machine Structural Carbon Steels", "High Speed Steels", "Structural Alloy Steels", "Gray Cast Irons", "Stainless Steels" and "Cemented Carbides". The "Hardness" of the workpieces to be ground may be classified, for instance, into "Raw" and "Hardened", and also the "Hardened" may be further classified, for instance, into "55 Rc (=Rockwell "C" scale) and over" and "Below 55 Rc". The Grinding Depths may be set according to grinding modes which may be classified into "Traverse" and "Plunge", and in each grinding mode "Depths of Cut" for both "Rough Grinding" and "Accurate Grinding" and "Finish Grinding Depths" may be set. In this connection, the grinding conditions, which have been stored in the controlling unit 31, have been obtained from experience. Thus, it will be understood that the grinding conditions can be determined by determining the "Materials or Kinds" and the "Hardnesses" of the workpieces to be ground.

The CRT display 33 is so arranged as to display items of the grinding conditions and data necessary to perform grinding operations so that the operator of the grinding machine 1 can operate the controlling unit 31 in a conversational or dialog mode. Some of the items of the grinding conditions and data have been previously stored in the controlling unit 31 and are shown on the CRT display 33 to be selected by the operator of the grinding machine 1. Also, some of the grinding conditions and data are inputted into the controlling unit 31 by the operator as needed and are also shown on the CRT display 33. Anyway, in order to perform grinding operations, the operator of the grinding machine 1 can operate the controlling unit 31 by the use of the keyboard 35 by watching the CRT display 33.

In the preferred embodiment, the CRT display 33 is so arranged as to display items of the grinding conditions and data by 4 pages as follows:

Page 1: "Data Input Modes", "Shapes to be Made by Grinding", "Grinding Modes" and "Necessity for Continuous Grinding" are shown on the CRT display 33 so that the operator of the grinding machine 1 can select from among them. Also, the "Data Input Modes", "Automatic", "Manual" and "Semi-automatic" are shwon so that the operator can determine the operation of the grinding machine 1. As the "Shapes to be Made by Grinding", "Flat", "Skipped" (toothed), "Grooved" and "Stepped" are displayed, the operator is able to select shapes to be made on workpieces to be ground. The "Grinding Modes", "Plunge" and "Traverse" are shown for the alternative selection by the operator, and also "Yes" and "No" are likewise shown as the "Necessity for Continuous Grinding".

Page 2: "Materials or Kinds of Workpiece" and "Hardnesses of Workpiece" and qualities of grinding wheels are displayed on the CRT display 33 so that the operator of the grinding machine 1 can determine the grinding conditions.

Page 3: Shown on the CRT display 33 are "Diameter of Grinding Wheel", "Width of Grinding Wheel", "Length of Workpiece" "Width of Workpiece", "Indexing Pitches" and so on. Thus, the operator of the grinding machine 1 can input to the controlling unit 31 the desired data as to the items shown on the CRT display 33 by use of the keyboard 35 by watching the CRT display 33.

Page 4: Shown on the CRT display 33 are "Grinding Allowance of Workpiece", "Finish Grinding Allowance", "Return Stroke of Grinding Wheel", "Rough Grinding Depth/time", "Finish Grinding Depth/time", "Rough Grinding Feed Width", "Finish Grinding Feed Width", "Sparking-out Frequency", "Revolutional Speed of Grinding Wheel" "Dressing Frequency", "Grinding Wheel Wear Compensation"

and so on. Thus, as to these items shown on the CRT display 33, the operator of the grinding machine 1 can input to the controlling unit 31 the desired data depending upon the data input modes, by use of the keyboard 35 and by watching the CRT display 33.

Referring now to FIG. 4, the grinding conditions actually necessary for grinding operations are computed as shown in the flow chart based upon the grinding conditions and data which have been inputted into the controlling unit 31. As has been described hereinbefore, some of the grinding conditions and data have been previously stored in the controlling unit 31, and some of them are inputted to the controlling unit 31 by the operator of the grinding machine 1 by use of the CRT display 33 and the keyboard 35. When the grinding mode, that is, the traverse grinding, or the plunge grinding is determined at step S1 in FIG. 4, the program is advanced to step S2.

If the plunge grinding is determined at step S1, the dressing frequency at step S2 is $$X = INT\left(\frac{50BC}{\pi DK} + 0.85\right) \quad (1)$$

where:
INT = integer
X = dressing frequency
A = width of workpiece
B = length of workpiece
C = grinding allowance
D = diameter of grinding wheel
K = grinding ratio When the traverse grinding is determined at step S1, the dressing frequency at step S2 is $$X' = INT\left[\frac{50ABC}{\pi DbK} + 0.85\right] \quad (1')$$

where:
b = width of grinding wheel

In the case of plunge grinding, the total wear amount at step S3 is $$d = \frac{BC}{K\pi D} \quad (2)$$

where:
d = total wear amount

Also, in the case of plunge grinding, the total wear amount per grinding allowance at step S4 is $$\eta = \frac{B}{K\pi D} \quad (3)$$

where:
$\eta$ = total wear amount per grinding allowance

In the case of traverse grinding, the total wear amount at step S3 and the wear amount per grinding allowance at step 4 are $$d = \frac{ABC}{K\pi Db} \text{ and} \quad (2')$$

$$\eta = \frac{AB}{K\pi Db} \quad (3')$$

Then, a decision is made at step S5 as to whether the dressing frequency (X) is zero or not. When the dressing frequency (X) is zero (YES), the operation is advanced to step S6. When it is not zero (NO), the program is advanced to step S7.

At step S7, a decision is made as to whether the grinding wheel 9 is of a diamond tool or not. When the grinding wheel 9 is of a diamond tool, (YES), the program is advanced to step S6, and when it is not of a diamond tool (NO), the program is advanced to step S8.

At step S6 where the dressing frequency is zero (X=0), the depth setting frequencies, the total grinding depths and the total wear amounts of the grinding wheel 9 all in the rough and finish grindings and also the last feed of the grinding wheel 9 are computed in both the plunge and traverse grindings based upon the grinding conditions and data which have been stored in the controlling unit 31. In both the rough and finish grindings without dressing, the vertical movement of the grinding wheel 9 is controlled by the controlling unit 31 based upon the results which are computed at step S6.

At step S8 where the dressing frequency is not zero (X≠0), the dressing frequency (I) as a variable is set to zero (0) and the program is advanced to step S9 where the grinding depth between dressings is obtained from the following formula:

$$C_I = \frac{C}{X}$$

where:
$C_I$ = grinding depth between dressings

At step S10, the depth setting frequency, the grinding depth and the wear amount of the grinding wheel 9 in the rough grinding are computed based upon the grinding conditions and data which have been stored in the controlling unit 31.

At step S11. the vertical movement of the grinding wheel 9 is compensated by a wear amount which results from the dressing, and the program is advanced to step S12 with the addition of 1 (one) to the dressing frequency (I) as the variable. At step S12, a decision is made as to whether the dressing frequency (I) as the variable is equal to the dressing frequency (X) or (X') (I=X?). When the dressing frequency (I) is equal to the dressing frequency (X) or (X') (YES), the program is advanced to step S13, and when they are not equal (NO), the program is returned to step S10.

At step S13, the total depth setting frequency, the total grinding depth and the total wear amount and the total feed of the grinding wheel 9 during the rough grinding are computed based upon the results which have been computed at steps S10, S11 and S12. Then, the depth setting frequency, the total grinding depth and the total wear amount in the finish grinding and the last depth setting are further computed at step S13 based upon the results initially obtained at step S13. The vertical movement of the grinding wheel 9 and the dressing of the same by the dressing means 11 are controlled by the controlling unit 31 based upon the results which have been computed at step S13.

As has been thus far described in the above, according to the present invention, the grinding conditions and data necessary for grinding operations have been previously stored in the controlling unit 31 and also can be easily inputted thereto an occasion by the operator of the grinding machine 1 by use of the keyboard 35 by watching the CRT display 33. Accordingly, the grinding operations can be automatically and easily performed with a high degree of accuracy by selecting the grinding modes and inputting the necessary grinding conditions and data to the controlling unit 31. Also, the grinding wheel 9 of the grinding machine 1 can be automatically dressed under the control of the controlling unit 31.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A method of controlling a grinding machine having a grinding wheel and table for holding a workpiece for perform desired operations automatically, including the steps of:
   inputting into a controlling unit data concerning grinding charactertistics of a plurality of grinding wheels and workpieces to be ground and data concerning a desired operation;
   inputting into the controlling unit data concerning operational parameters for a dressing means of said grinding machine including parameters necessary to compute dressing frequency and including the width and length of the workpiece, the grinding allowance, the diameter of the grinding wheel and the grinding ratio;
   computing grinding operation information necessary for the desired operation by means of said controlling unit, in accordance with the inputted data concerning grinding characteristics of the grinding wheels and workpieces and desired operation data;
   computing dressing means operation information necessary for the desired operation of said dressing means, in accordance with both the inputted data concerning grinding characteristics of the grinding wheels and workpieces and said data concerning operational parameters for said dressing means including the width and length of the workpiece, the grinding allowance, the diameter of the grinding wheel and the grinding ratio;
   converting said grinding operation information and the dressing means operation information into instructions for controlling said grinding machine; and
   controlling said grinding machine to perform said desired operations in accordance with said instructions.

2. The method of claim 1, further including inputting into the controlling unit data concerning the width of the grinding wheel.

3. A method of controlling a grinding machine having a grinding wheel and table for holding a workpiece to perform desired operations automatically, including the steps of:
   inputting into a controlling unit data concerning grinding characteristics of a plurality of grinding wheels and workpieces to be ground and data concerning a desired operation;
   inputting into the controlling unit data concerning operational parameters for a dressing means of said grinding machine including parameters necessary to compute dressing frequency;
   said dressing frequency X being computed in accordance with at least one of:

$$X = INT\left(\frac{50BC}{DK} + 0.85\right)$$

and $$X' = INT\left(\frac{50ABC}{DbK} + 0.85\right)$$

where:
A = the width of the workpiece;
B = the length of the workpiece;
C = the grinding allowance;
D = the diameter of the grinding wheel;
K = the grinding ratio;
b = the width of the grinding wheel; and
INT = integer;
   computing grinding operation information necessary for the desired operation by means of said controlling unit, in accordance with the inputted data concerning grinding characteristics of the grinding wheels and workpieces and desired operation data;
   computing dressing means operation information necessary for the desired operation of said dressing means, in accordance with both the inputed data concerning grinding characteristics of the grinding wheels and workpieces and said data concerning operational parameters for said dressing means;
   converting said grinding operation information and the dressing means operation information into instructions for controlling said grinding machine; and
   controlling said grinding machine to perform said desired operations in accordance with said instructions.

4. A method according to claim 3, wherein said data concerning grinding characteristics and the desired operation is stored in memory units and said data concerning grinding characteristics is selectively transferred to the controlling unit by an operator.

5. A method according to claim 3, wherein the computed dressing means operation information comprises the frequency at which said grinding wheel should be dressed.

6. A method according to claim 3, wherein the computed dressing means operation information comprises the estimated wear of said grinding wheel.

7. A method according to claim 3, wherein said instructions include instructions for controlling the vertical movement of said grinding wheel.

8. A method according to claim 3, wherein said data concerning a desired operation comprises a grinding mode.

9. An apparatus for controlling a grinding machine having a grinding wheel, dressing means and a means for holding a workpiece to perform a desired operation automatically, comprising:
   a controlling means for controlling the operation of the grinding machine;
   an input means for programming said controlling means with data concerning grinding characteristics of various grinding tools and materials to be ground and operational characteristics for said dressing means, and for inputting data concerning a desired operation into said controlling means, said data including the width and length of said workpiece, the grinding allowance, the diameter of said grinding wheel and the grinding ratio;

a computing means, within said controlling means, for computing information necessary for the operation of said grinding machine including frequency of use of said dressing means, which frequency is computed in accordance with the inputted data including the width and length of said workpiece, the grinding allowance, the diameter of said grinding wheel and the grinding ratio;

wherein said controlling means uses said information to control the operation of said grinding machine to perform said desired operation.

10. An apparatus according to claim 9, wherein said controlling means comprises memory units for storing said data concerning grinding characteristics.

11. An apparatus according to claim 9, wherein said controlling means comprises a keyboard and a screen for inputting data concerning said grinding characteristics and instructions to said controlling means.

* * * * *